US007222803B2

(12) United States Patent
Bolton

(10) Patent No.: US 7,222,803 B2
(45) Date of Patent: May 29, 2007

(54) LIQUID DISPENSING APPARATUS

(75) Inventor: Terence William Bolton, Pulboroough (GB)

(73) Assignee: Jakks Pacific, Inc., Malibu, CA (US)

(*) Notice: Subject to any disclaimer, the term of this patent is extended or adjusted under 35 U.S.C. 154(b) by 0 days.

(21) Appl. No.: 10/181,049

(22) PCT Filed: Dec. 6, 2000

(86) PCT No.: PCT/GB00/04650

§ 371 (c)(1),
(2), (4) Date: Nov. 12, 2002

(87) PCT Pub. No.: WO01/49420

PCT Pub. Date: Jul. 12, 2001

(65) Prior Publication Data

US 2003/0090011 A1 May 15, 2003

(30) Foreign Application Priority Data

Dec. 30, 1999 (GB) ................................ 9930876.9

(51) Int. Cl.

| | |
|---|---|
| ***B05B 11/06*** | (2006.01) |
| ***B05B 9/00*** | (2006.01) |
| ***F16K 15/00*** | (2006.01) |
| ***F16K 17/00*** | (2006.01) |
| ***F16K 21/04*** | (2006.01) |
| ***F04B 43/00*** | (2006.01) |
| ***B65D 1/32*** | (2006.01) |

(52) U.S. Cl. ...................... 239/326; 239/327; 239/363; 137/533.27; 417/478; 417/479

(58) Field of Classification Search ................ 239/302, 239/303, 304, 306, 307, 308, 326, 327, 328, 239/330, 333, 337, 340, 341, 346, 355, 361, 239/362, 363, 373, 570, 571; 137/512.15, 137/854, 533.27, 533.21; 222/206, 209, 222/633, 632, 631; 417/478, 479
See application file for complete search history.

(56) References Cited

U.S. PATENT DOCUMENTS 209,975 A * 11/1878 Morey ..................... 137/216.2
401,355 A * 4/1889 Kneuper ..................... 239/327
613,222 A * 10/1898 Blackman .................. 239/304

(Continued)

FOREIGN PATENT DOCUMENTS

GB 213 324 A 3/1924

(Continued)

*Primary Examiner*—Kevin Shaver
*Assistant Examiner*—Darren Gorman
(74) *Attorney, Agent, or Firm*—Richard B. Klar; Law Office of Richard B. Klar

(57) ABSTRACT

A hand operated flexible bulb for use with a liquid dipensing apparatus 5, the bulb comprises an open ended neck 2 which is securable in an air tight manner to a liquid dispensing apparatus. The flexible bulb is provided with an air inlet 6 separate from the open ended neck, the air inlet having a valve 7 associated therewith such that on application of hand pressure to the bulb, the valve closes to force air through the open ended neck and on release of pressure, the valve opens drawing air into the inlet.

14 Claims, 2 Drawing Sheets

U.S. PATENT DOCUMENTS

| | | | | | |
|---|---|---|---|---|---|
| 2,066,977 | A | * | 1/1937 | Iler | 222/209 |
| 2,239,716 | A | | 4/1941 | Hothersall | |
| 2,249,478 | A | * | 7/1941 | Lassmann | 239/354 |
| 2,357,979 | A | * | 9/1944 | Schmitt et al. | 239/362 |
| 2,463,002 | A | | 3/1949 | Smith | |
| 2,506,751 | A | * | 5/1950 | Trask | 417/550 |
| 2,896,840 | A | * | 7/1959 | Hendry | 417/479 |
| 2,906,463 | A | * | 9/1959 | Curry | 239/338 |
| 3,825,141 | A | * | 7/1974 | Campagna | 215/12.2 |
| 5,190,220 | A | * | 3/1993 | Bolton | 239/305 |
| 5,601,112 | A | * | 2/1997 | Sekiya et al. | 137/512.15 |
| 5,794,821 | A | | 8/1998 | Foster et al. | 222/321.9 |
| 6,059,152 | A | * | 5/2000 | Mayfield | 222/382 |

FOREIGN PATENT DOCUMENTS

| | | |
|---|---|---|
| GB | 2 273 065 A | 6/1994 |

* cited by examiner

LIQUID DISPENSING APPARATUS

This invention relates to apparatus for dispensing a fine spray of liquid particles and more especially, but not exclusively, to liquid dispensers known as airbrushes.

GB Patent No. 2273065 describes a hand operated pump which can be connected to a liquid dispensing apparatus with the purpose of supplying air under pressure to a liquid source such as a pen with a nib of absorbent material. The hand pump described in that patent is suitable for use with various forms of liquid dispensing apparatus. International Patent Application PCT GB97/01933 describes one such liquid dispensing apparatus. Briefly, the apparatus described therein comprises a tubular casing having at one end an inlet nozzle connectable to a source of gas under pressure and at its other end an outlet nozzle having an orifice in communication with an expansion chamber bounded by sides which diverge away from or converge towards the orifice, and means for locating a liquid source including an elongate body and an absorbent nib at least partially within the casing with the nib within or in close proximity to the nozzle orifice. The liquid source may conveniently comprise a pen formed from a nib of absorbent material such as what is commonly referred to as a felt tipped pen.

Another example of such a liquid dispensing apparatus is described in GB Patent 2273065. Briefly this apparatus comprises a holder for releasably supporting a liquid source such as a felt tipped pen adjacent a nozzle. The nib of the pen is positioned in close proximity to the nozzle outlet. A source of pressurised air is supplied to the nozzle and is thereby directed onto and over the nib of the pen causing liquid absorbed therein to be dispensed in a fine particular spray in air.

The hand operated pump described in GB 2273065 comprises a bulb of flexible material formed with an open ended neck which locates over the inlet end of the liquid dispensing apparatus. Air enters the bulb via a nozzle in the liquid dispensing apparatus. When the liquid source has been positioned adjacent the nozzle, the flexible bulb is squeezed and the air pushed out onto and over the liquid source directed by the nozzle. When the bulb is released, air is again drawn up through the nozzle of the liquid dispensing apparatus and into the bulb.

In accordance with the present invention there is provided an airbrush apparatus comprising a holder for releasably holding a liquid source, such as a felt-tipped pen, adjacent a nozzle, the holder having an inlet connectable to a source of gas under pressure and an outlet adjacent the nozzle for dispensing the gas about the liquid source, the source of gas comprising a hand operated flexible bulb, the bulb comprising an open ended neck which is securable in an air tight manner to the holder, wherein the apparatus is provided with an air inlet separate from the open ended neck of the flexible bulb, the air inlet having a valve associated therewith such that on application of hand pressure to the bulb, the valve closes to force air through the open ended neck and on release of pressure, the valve opens drawing air into the inlet.

A disadvantage of the pumps described in GB2273065 is that there is only provided a single orifice for both the inlet and outlet of air. When the liquid source is positioned in the dispensing apparatus, the bulb is squeezed applying air under pressure to the liquid source which is directed by the nozzle to create the fine particulate spray. When the bulb is released, pressure is equilibrated by air drawn in back through the nozzle to the flexible bulb. This may lead to some ink being drawn through the nozzle which, when the bulb is given a subsequent squeeze, larger globules of liquid may be dispensed onto the user's substrate. A further disadvantage with this prior art arrangement is that the bulb takes a considerable length of time to fully expand between squeezes. These problems are alleviated by the provision of a separate air inlet in accordance with the present invention.

Any suitable valve may be used for closing the air inlet, however the valve is conveniently provided in the form of a closure member slidably mounted on a shaft, the shaft projecting from the inner surface of the bulb adjacent one or more orifices defining the air inlet, and comprising an end stop to prevent separation of the closure member from the shaft. The closure member is preferably comprised of a sheet of flexible material. In a preferred embodiment, the air inlet comprises a plurality of orifices arranged in a circumferential fashion about a shaft which projects from the inner surface of the bulb and the closure member comprises a circular sheet of material which has an external circumference greater than that defined by the plurality of orifices.

The air inlet and valve may be positioned in any location remote from the open ended neck of the bulb, however they are preferably positioned directly opposing the open ended neck of the bulb.

The bulb may be produced from a flexible material such as rubber which can be squeezed or otherwise deformed to expel air under pressure therefrom. Preferably the surface of the bulb is provided with a nonslip surface. The invention will now be described by way of example only with reference to the accompanying diagrammatic drawings in which.

Figure 1:
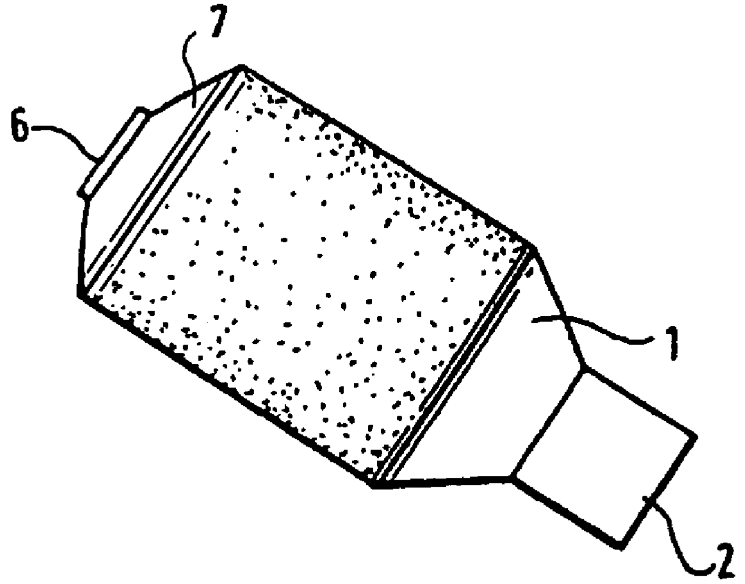
FIG. 1 shows one embodiment of a hand operated flexible bulb according to the present invention.
Figure 2:
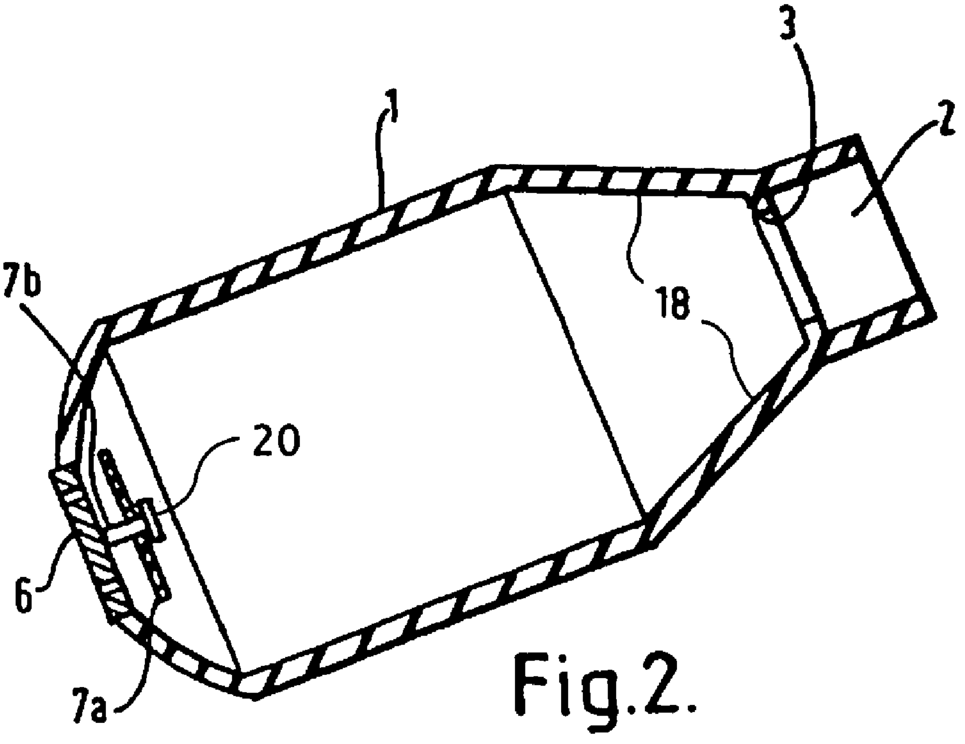
FIG. 2 shows a cross sectional view of the embodiment of FIG. 1.

As can be seem from the FIGS., the bulb comprises a continuous surface of flexible rubber 1. To one end, the bulb 1 has an open ended neck 2. On the inner surface of the neck 2 is an annular rib 3 which is suitably configured to fit in an airtight manner around complementary annular groove 4 on liquid dispensing apparatus 5. To the opposite end, the bulb carries an air inlet 6 with which is associated a valve 7. The air inlet 6 comprises a small circular disc which carries a plurality of holes in a circumferential arrangement about the centre of the disc. Protruding from the under surface of the air inlet is shaft 7*b* of the valve 7 on which is slidably mounted a circular closure member 7*a* of a flexible sheet material. The circumference of the closure member is substantially equal to or slightly greater than the outer circumference of the air inlet 6. The valve 7 further comprises an end stop 20 to prevent separation of the closure member 7*a* from the shaft 7*b*.

The main body of the outer surface of the bulb 1 is provided with a non-slip surface 7 which aids grip of the bulb during use.

Figure 3:
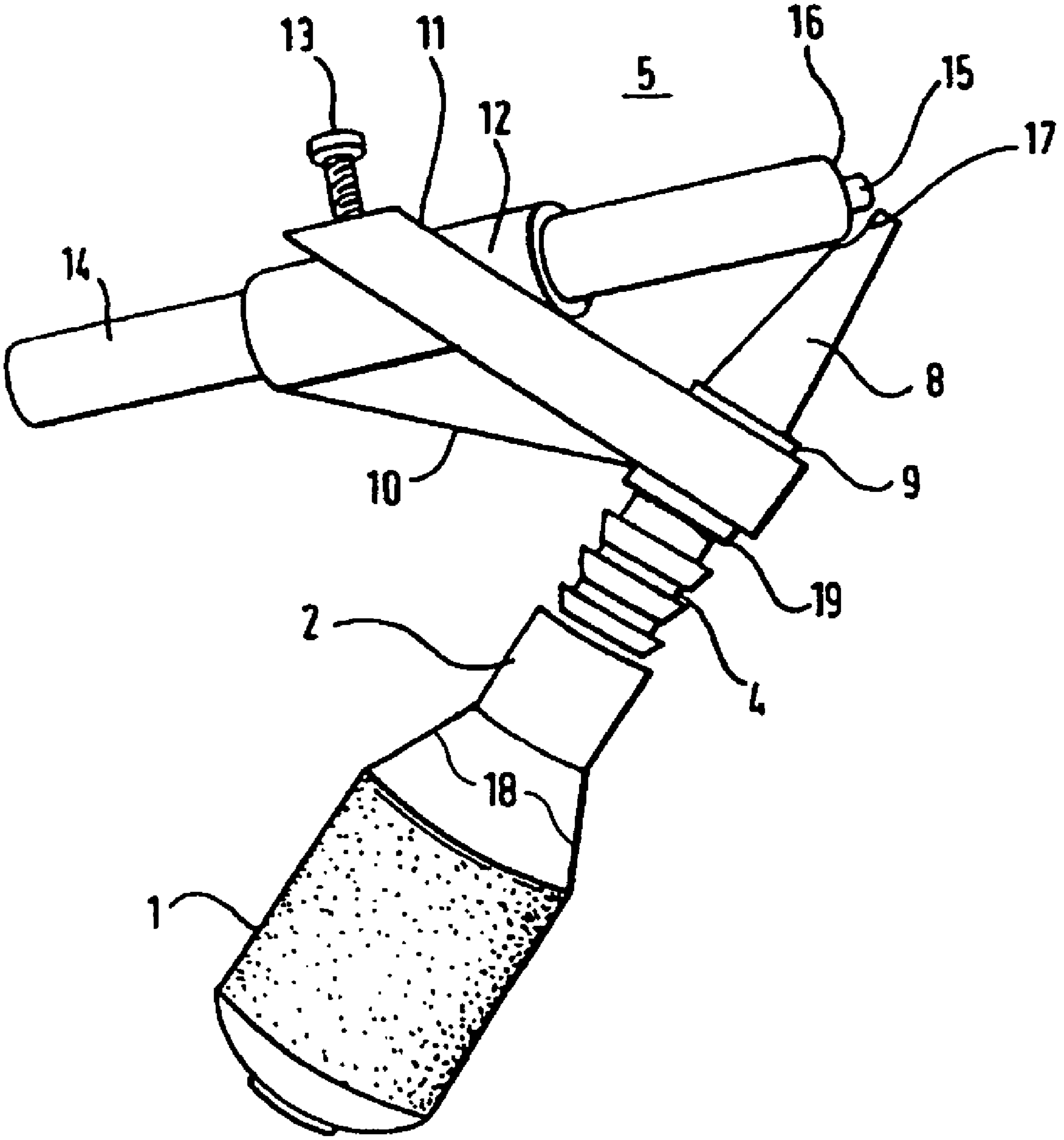
FIG. 3 shows the embodiment of FIG. 1 in combination with a liquid dispensing apparatus.

The air brush arrangement illustrated in FIG. 3 comprises a hand operated pump in accordance with the present invention. The bulb is connected to a nozzle 8 retained within a first channel 9 of a plastics holder 10. The holder 10 includes a second channel 11 within which is removably mounted a sleeve 12, the sleeve 12 is retained in place with a suitable screw fixing 13. Positioned within the sleeve 12 is a felt-tipped pen 14.

The channels 9, 11 are mutually inclined so that the tip 15 of the pen 14 is positioned in close proximity to the nozzle outlet. When using a nozzle as illustrated in FIG. 3, the pen shoulder 16 adjacent the tip 15 is positioned against a step 17 for location purposes.

The holder 10 is designed to be held a specified distance from the substrate on which a fine spray of particles is to be applied. Operation of the hand pump by squeezing the bulb causes air under pressure to force the valve 7 shut and simultaneously to flow directly through the nozzle 8. As this compressed air passes over the tip 15 of the pen a fine dispersion of particles is produced on the substrate.

As the bulb is released air now at a higher pressure outside the bulb rushes in through the air inlet 6 opening valve 7 and re-inflating the bulb until the air pressure to the inside and outside of the bulb is equalised.

As can be seen from FIG. 3, on assembly of the liquid dispensing apparatus, the neck 2 of the bulb is forced over the inclined annular ribs 18 on the outer surface of the nozzle until the end of the neck seats adjacent the end stop 19. At this point, the step of inclined sections 18 is positioned just behind the annular rib 3 of the neck 2 and ensures that, despite a build up pressure within the bulb or nozzle, the bulb is retained securely by the nozzle.

As mentioned previously, the pen 14 may be a felt-tipped pen. Alternatively it may comprise a cartridge containing a technical drawing pen, the nib of a conventional pen or a pen like cylindrical container including for example, a dip tube through which a colourant such as ink can be withdrawn. Alternatively, edible food colourants, ink based acrylic and emulsified paints may be dispensed by means of the apparatus. A selection of sleeves 12 may be provided to enable a variety of different liquid sources to be employed.

It will be appreciated that the foregoing is merely exemplary of one embodiment of the pump according to the present invention and of just one form of liquid dispensing apparatus with which it may be used. The skilled reader will understand that modifications can readily be made thereto without departing from the true scope of the invention.

The invention claimed is:

1. An airbrush apparatus comprising a holder for releasably holding a liquid source adjacent a nozzle, the nozzle having an inlet connectable to a source of gas under pressure and an outlet for dispensing the gas about the liquid source to disperse fine liquid particles, the source of gas comprising a hand operated flexible bulb, the bulb comprising an open ended neck which is securable in an air tight manner to the holder, wherein the apparatus is provided with an air inlet separate from the open ended neck of the flexible bulb, the air inlet having a air only valve associated therewith such that on application of hand pressure to the bulb, the air only valve closes to force air through the open ended neck and on release of pressure, the air only valve opens drawing air into the air inlet; and wherein the air inlet comprises one or more orifices and the air only valve comprises a closure member slidably mounted on a shaft, the shaft projecting from the inner surface of the bulb adjacent the one or more orifices.

2. The airbrush apparatus as claimed in claim 1 further comprising an end stop to prevent separation of the closure member from the shaft.

3. The airbrush apparatus as claimed in claim 2 wherein the air inlet comprises a small circular disc, said circular disc carries said one or more orifices in a circumferential arrangement about the centre of the disc.

4. An airbrush apparatus as claimed in claim 2 wherein said one or more orifices comprises a plurality of orifices arranged in a circumferential fashion about the shaft and the closure member comprises a circular sheet of material having an external circumference greater than that defined by the plurality of orifices.

5. An airbrush apparatus as claimed in claim 1 wherein the air inlet and the valve are positioned in the flexible bulb.

6. The airbrush apparatus as claimed in claim 1 wherein the bulb is securable to the nozzle by means of an inwardly extending annular rib provided on the inner surface of the open ended neck of the bulb, the rib being configured to sit in an annular groove provided on the outer surface of the nozzle.

7. An airbrush apparatus as claimed in claim 1 wherein the outer surface of the bulb is provided with a non-slip covering.

8. An airbrush apparatus as claimed in claim 1 wherein said valve closes to force air through said open ended neck of the bulb so that air passes over the surface of a liquid soaked nib of the liquid source causing droplets from said liquid to be lifted from the nib and thereby form a spray.

9. The airbrush apparatus as claimed in claim 3, wherein the shaft projects from said circular disc.

10. The airbrush apparatus as claimed in claim 1, wherein said air inlet is located at an opposite end of said open ended neck of the flexible bulb.

11. An airbrush apparatus as claimed in claim 1 wherein the outer surface of the bulb is provided with a non-slip covering, wherein said non-slip covering consists of non-protruding layer of coarse material.

12. The airbrush apparatus as claimed in claim 1, wherein the air inlet comprises a circular disc having a plurality of holes in a circumferential arrangement about the center of said disc.

13. The airbrush apparatus as claimed in claim 1, wherein the closure member, which is slidably mounted on the shaft of the air only valve, moves toward the air inlet when the bulb is pressed and air pressure inside the bulb pushes against the closure member, preventing air inside the bulb to egress through the air inlet and wherein said closure member moves away from the air inlet when the bulb is relaxed, allowing air from outside to ingress to the bulb through the air inlet.

14. The airbrush apparatus as claimed in claim 1, wherein the bulb continuously supplies air through the nozzle to the holder for releasably holding a liquid source when hand pressure is applied to the bulb.

* * * * *